US008728435B2

(12) United States Patent
Larcher et al.

(10) Patent No.: US 8,728,435 B2
(45) Date of Patent: May 20, 2014

(54) HIGH SPECIFIC SURFACE/REDUCIBILITY CATALYST/CATALYST SUPPORT COMPOSITIONS COMPRISING OXIDES OF ZIRCONIUM, CERIUM AND LANTHANUM AND OF YTTRIUM, GADOLINIUM OR SAMARIUM

(75) Inventors: Olivier Larcher, Pennington, NJ (US); Emmanuel Rohart, Sainte Soulle (FR); Stephan Verdier, Lyons (FR)

(73) Assignee: Rhodia Operations, Aubervilliers (FR)

( * ) Notice: Subject to any disclaimer, the term of this patent is extended or adjusted under 35 U.S.C. 154(b) by 1522 days.

(21) Appl. No.: 12/300,845

(22) PCT Filed: May 7, 2007

(86) PCT No.: PCT/EP2007/054397
§ 371 (c)(1),
(2), (4) Date: Oct. 1, 2009

(87) PCT Pub. No.: WO2007/131901
PCT Pub. Date: Nov. 22, 2007

(65) Prior Publication Data
US 2010/0040523 A1    Feb. 18, 2010

(51) Int. Cl.
*C01G 25/02*    (2006.01)
*B01J 23/00*    (2006.01)
*B01J 23/10*    (2006.01)

(52) U.S. Cl.
USPC ............ 423/594.12; 502/303; 502/304

(58) Field of Classification Search
USPC ......... 423/21.1, 69, 71, 85, 411, 594.12, 608; 502/302–304, 349
See application file for complete search history.

(56) References Cited

U.S. PATENT DOCUMENTS

| 6,171,572 | B1 * | 1/2001 | Aozasa ............... 423/594.12 |
| 6,387,338 | B1 | 5/2002 | Anatoly et al. |
| 7,820,586 | B2 | 10/2010 | Hedouin |
| 7,964,527 | B2 | 6/2011 | Larcher et al. |
| 8,158,551 | B2 | 4/2012 | Verdier et al. |
| 2006/0178261 | A1 | 8/2006 | Larcher et al. |
| 2006/0210462 | A1 | 9/2006 | Larcher et al. |
| 2006/0263284 | A1 | 11/2006 | Larcher et al. |
| 2007/0093382 | A1 * | 4/2007 | Vanderspurt et al. ......... 502/304 |
| 2007/0189955 | A1 | 8/2007 | Larcher et al. |
| 2008/0020925 | A1 | 1/2008 | Larcher et al. |

FOREIGN PATENT DOCUMENTS

| EP | 1 803 686 A1 | 7/2007 |
| WO | WO 98/16472 A1 | 4/1998 |
| WO | WO 98/45212 A1 | 10/1998 |
| WO | WO 02/072256 A2 | 9/2002 |
| WO | WO 03/020643 A1 | 3/2003 |

(Continued)

*Primary Examiner* — Anthony J Zimmer
(74) *Attorney, Agent, or Firm* — Dentons US LLP

(57) ABSTRACT

Catalyst/catalyst support composition essentially consist of oxides of zirconium, cerium and lanthanum and of another rare earth selected from among yttrium, gadolinium and samarium, having a proportion of the lanthanum oxide and the oxide of the other rare earth of at least 15% and specific surfaces of at least 40 $m^2/g$ and at least 15 $m^2/g$ after calcination respectively for 4 hours at 1,000° C. and 10 hours at 1,150° C.; after calcination for 10 hours at 1,200° C. these have a surface of at least 7 $m^2/g$ and such surface is at least 5 $m^2/g$ for an embodiment in which after 10 hours of calcination at 1,150° C. the composition is in the form of a pure solid solution.

13 Claims, 1 Drawing Sheet

(56) References Cited

FOREIGN PATENT DOCUMENTS

| WO | 2004/002893 A2 | 1/2004 |
| WO | WO 2004/085039 A1 | 10/2004 |
| WO | WO 2004/085314 A2 | 10/2004 |
| WO | WO 2004/085806 A2 | 10/2004 |
| WO | WO 2005/023728 A2 | 3/2005 |
| WO | 2005/082782 A2 | 9/2005 |
| WO | 2007/093593 A1 | 8/2007 |
| WO | 2007/107546 A1 | 9/2007 |

* cited by examiner

HIGH SPECIFIC SURFACE/REDUCIBILITY CATALYST/CATALYST SUPPORT COMPOSITIONS COMPRISING OXIDES OF ZIRCONIUM, CERIUM AND LANTHANUM AND OF YTTRIUM, GADOLINIUM OR SAMARIUM

CROSS-REFERENCE TO EARLIER APPLICATIONS

This application is a national phase of PCT/EP 2007/054397, filed May 7, 2007 and designating the United States (published in the French language on Nov. 22, 2007, as WO 2007/131901A1; the title and abstract were also published in English), which claims foreign priority under 35 U.S.C. §119 of FR 0604287, filed May 15, 2006 and of FR 0610033, filed Nov. 16, 2006, each hereby expressly incorporated by reference in its entirety and each assigned to the assignee hereof.

The present invention relates to a composition based on an oxide of zirconium, on an oxide of cerium, on an oxide of lanthanum and on an oxide of another rare earth metal chosen from yttrium, gadolinium and samarium, with a stable specific surface, to its process of preparation and to its use in the treatment of exhaust gases from automobiles.

"Multifunctional" catalysts are currently used for the treatment of exhaust gases from internal combustion engines (automobile afterburning catalysis). The term "multifunctional" is understood to mean catalysts capable of carrying out not only oxidation, in particular of carbon monoxide and hydrocarbons present in exhaust gases, but also reduction, in particular of nitrogen oxides also present in these gases ("three-way" catalysts). Zirconium oxide and cerium oxide today appear as two particularly important and advantageous constituents of materials participating in the composition of catalysts of this type. In order to be effective in such a use, these materials have to exhibit a specific surface which remains sufficiently great even at high temperature.

It is known to use, in combination with zirconium and cerium, other rare earth metals in order to obtain materials exhibiting a satisfactory specific surface. However, they are in some cases complex combinations as they comprise up to three other rare earth metals in addition to the elements zirconium and cerium. In addition, it has always been sought to improve this surface stability, that is to say to obtain still greater surface values at the same temperature or surface values which are still sufficiently great at even higher temperatures.

A need thus exists for materials with a specific surface with increased surface stability which, if possible, do not have excessively complex compositions.

A first subject matter of the invention is products which meet this need.

Furthermore, another quality required for the above-mentioned materials is their reducibility. The term "reducibility" is understood to mean, here and for the remainder of the description, the level of cerium(IV) in these materials which is capable of being converted to cerium(III) under the effect of a reducing atmosphere and at a given temperature. This reducibility can be measured, for example, by a consumption of hydrogen within a given temperature range. It is due to the cerium, which has the property of being reduced or being oxidized. This reducibility must, of course, be as high as possible.

It is thus advantageous to obtain products exhibiting both a high reducibility and a stabilized specific surface, that is to say a specific surface exhibiting a satisfactory surface value at high temperature.

A second subject matter of the invention is thus the development of a composition which can offer an advantageous combination of these properties.

With this aim and according to a first embodiment, the composition according to the invention is essentially composed of a zirconium oxide, a cerium oxide, a lanthanum oxide and an oxide of another rare earth metal chosen from yttrium, gadolinium and samarium, characterized in that it exhibits the following characteristics:
- a specific surface after calcination for 4 hours at 1000° C. of at least 40 $m^2/g$;
- a specific surface after calcination for 10 hours at 1150° C. of at least 15 $m^2/g$;
- a specific surface after calcination for 10 hours at 1200° C. of at least 7 $m^2/g$;
- a content of lanthanum oxide and of oxide of the other rare earth metal of at least 15%.

According to a second embodiment of the invention, the composition is essentially composed of a zirconium oxide, a cerium oxide, a lanthanum oxide and an oxide of another rare earth metal chosen from yttrium, gadolinium and samarium, characterized in that it exhibits the following characteristics:
- a specific surface after calcination for 4 hours at 1000° C. of at least 40 $m^2/g$;
- a specific surface after calcination for 10 hours at 1150° C. of at least 15 $m^2/g$; the composition on conclusion of this calcination being in the form of a pure solid solution;
- a specific surface after calcination for 10 hours at 1200° C. of at least 5 $m^2/g$;
- a content of lanthanum oxide and of oxide of the other rare earth metal of at least 15%.

According to a third embodiment, the composition according to the invention is essentially composed of a zirconium oxide, a cerium oxide, a lanthanum oxide and an oxide of another rare earth metal chosen from yttrium, gadolinium and samarium, characterized in that it exhibits the following characteristics:
- a specific surface after calcination for 4 hours at 1000° C. of at least 40 $m^2/g$;
- a specific surface after calcination for 10 hours at 1150° C. of at least 15 $m^2/g$;
- a specific surface after calcination for 10 hours at 1200° C. of at least 7 $m^2/g$;
- a content of lanthanum oxide and of oxide of the other rare earth metal of at least 15%;
- a degree of reducibility, measured on the composition calcined for 4 hours at 900° C., of at least 80%.

According to a fourth embodiment of the invention, the composition is essentially composed of a zirconium oxide, a cerium oxide, a lanthanum oxide and an oxide of another rare earth metal chosen from yttrium, gadolinium and samarium, characterized in that it exhibits the following characteristics:
- a specific surface after calcination for 4 hours at 1000° C. of at least 40 $m^2/g$;
- a specific surface after calcination for 10 hours at 1150° C. of at least 15 $m^2/g$; the composition on conclusion of this calcination being in the form of a pure solid solution;
- a specific surface after calcination for 10 hours at 1200° C. of at least 5 $m^2/g$;
- a content of lanthanum oxide and of oxide of the other rare earth metal of at least 15%;
- a degree of reducibility, measured on the composition calcined for 4 hours at 900° C., of at least 80%.

Other characteristics, details and advantages of the invention will become even more fully apparent on reading the description which will follow, given in particular with reference to the appended drawings, in which.

Figure 1:
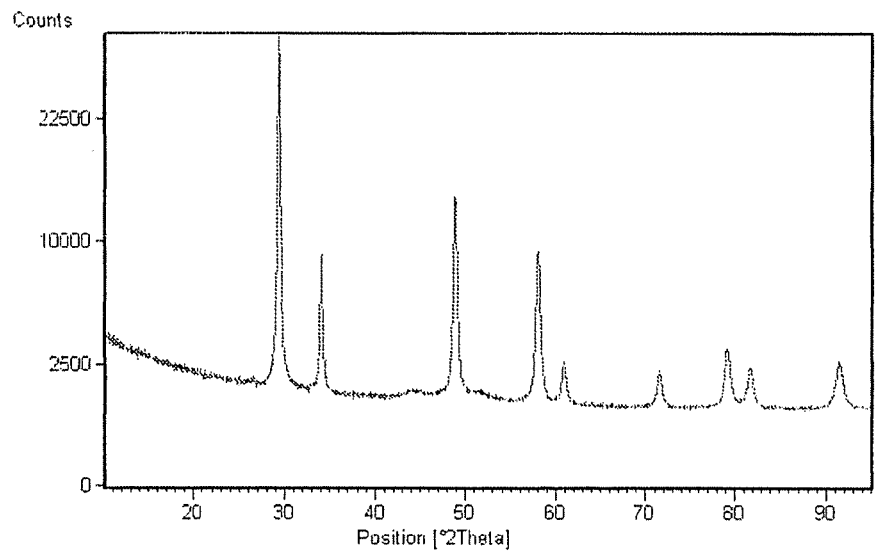
FIG. 1 is a diffractogram obtained by X-ray diffraction on a composition of the invention.

In the continuation of the description, the term "specific surface" is understood to mean the BET specific surface determined by nitrogen adsorption in accordance with standard ASTM D 3663-78 laid down from the Brunauer-Emmett-Teller method described in the periodical "The Journal of the American Chemical Society, 60, 309 (1938)".

It is specified that, in the continuation of the description, unless otherwise specified, the values at the limits are included in the ranges of values which are given.

The contents or levels of elements are given as weight of oxide of these elements, unless otherwise indicated, these oxides, for the expression of these contents, being considered in the form of the ceric oxide for cerium and in the $Ln_2O_3$ form for the other rare earth metals.

The specific surface values which are shown for a given temperature and a given duration correspond, unless otherwise indicated, to calcinations under air at a stationary temperature phase over the duration shown.

The compositions according to the invention are essentially composed of a mixture of four oxides of the elements zirconium, cerium, lanthanum and another rare earth metal which is either yttrium or samarium or gadolinium. The term "is essentially composed" is understood to mean that the composition under consideration comprises only the oxides of the four abovementioned elements and that it does not comprise the oxide of another element, for example of another rare earth metal, capable of having a positive influence on the stability of the specific surface of the composition. On the other hand, the composition may comprise elements such as impurities which may arise in particular from its preparation process, for example from the starting materials or starting reactants used.

The compositions of the invention exhibit a content for the lanthanum oxide/oxide of the other rare earth metal combination which is at least 15%. This content can be between 15% and 35%. Beyond 35%, the effect on the stability of the surface may no longer be perceptible. It should be noted that, if the content of lanthanum oxide or of oxide of the other rare earth metal is at least 30%, in particular within the range from 30% to 35%, it may be preferable to have a content of cerium oxide of at most 30%.

It is preferable for the compositions to exhibit a content of lanthanum of at least 2%. The relative proportions of the lanthanum to the other rare earth metal can vary within a wide range. A ratio of the content of lanthanum to that of the other rare earth metal (weight of lanthanum oxide/weight of oxide of the other rare earth metal ratio) of less than 1.5, indeed even of less than 1, may be preferable in order to obtain products with the highest surfaces.

The content of cerium is generally between 10% and 60%, preferably between 20% and 50%. This content can more particularly be between 30% and 45% and more particularly still between 40% and 45%.

Furthermore, the compositions of the invention are characterized by the specific surfaces which they exhibit at different temperatures.

As indicated above, they first of all exhibit a specific surface after calcination for 4 hours at 1000° C. of at least 40 $m^2/g$. Preferably, this surface can be at least 45 $m^2/g$ and more preferably still at least 50 $m^2/g$. Mention may be made, purely by way of specific example, that surfaces of approximately 55 $m^2/g$ can be achieved in the case of the third and fourth embodiments, indeed even of 60 $m^2/g$ in the case of the first and second embodiments.

The compositions of the invention subsequently exhibit a specific surface after calcination for 10 hours at 1150° C. of at least 15 $m^2/g$, it being possible for this surface to be even at least 18 $m^2/g$. Mention may be made, purely by way of specific example, that surfaces of approximately 23 $m^2/g$ can be achieved.

It should be noted here that the description which has just been provided and in particular all the characteristics which have been given apply to the compositions of the invention whatever the embodiment. However, according to specific embodiments (second and fourth embodiments), the compositions may, on conclusion of the calcination for 10 hours at 1150° C., exist in the form of a pure solid solution. The diffractograms obtained by X-ray diffraction on these compositions reveal in particular, within the latter, the existence of a single clearly identifiable phase of cubic crystal symmetry of fluorine type, thus reflecting the existence of a pure solid solution of the cerium, lanthanum, zirconium and other rare earth metal.

The compositions of the invention subsequently exhibit a specific surface after calcination for 10 hours at 1200° C. which varies according to the embodiment under consideration. In the case of the first and third embodiments, this surface is at least 7 $m^2/g$. In the case of the other embodiments, that is to say those which have just been described above and for which the composition is in the form of a solid solution after calcination at 1150° C., this surface is at least 5 $m^2/g$. According to an alternative form of these embodiments, this surface can also be at least 7 $m^2/g$, still after calcination for 10 hours at 1200° C. Advantageously, this being the case whatever the embodiment, the specific surface after calcination for 10 hours at 1200° C. is at least 10 $m^2/g$. Mention may be made, solely by way of specific example, that surfaces of approximately 15 $m^2/g$ may be achieved.

The compositions of the third and fourth embodiments of the invention exhibit, as other characteristic, a high reducibility which is reflected by a degree of reducibility of at least 80%. This degree can more particularly be at least 85% and more particularly still at least 90%. It is specified here and for the remainder of the description that this degree of reducibility is measured on a composition which has been subjected to calcination at 900° C. under air for 4 hours under stationary conditions.

The reducibility of the compositions is determined by the measurement of their hydrogen consumption, measured between 30° C. and 900° C. This measurement is carried out by temperature-programmed reduction using hydrogen diluted in argon. A signal is detected with a thermal conductivity detector. The consumption of the hydrogen is calculated from the missing area of the hydrogen signal from the base line at 30° C. to the base line at 900° C. The degree of reducibility represents the percentage of reduced cerium, it being understood that ½ mol of $H_2$ consumed and measured by this method corresponds to 1 mol of reduced Ce(IV).

The processes for the preparation of the compositions of the invention will now be described.

These processes exist in two alternative forms: the first alternative form corresponds to the preparation of the compositions according to the first two embodiments mentioned above and the second alternative form corresponds to the preparation of the compositions according to the last two embodiments mentioned above. As will be seen later, these two alternative forms differ only in the final stage, the calcination stage. The process according to the first alternative form is characterized in that it comprises the following stages:

(a) a mixture comprising compounds of zirconium, of cerium, of lanthanum and of the other rare earth metal is formed in a liquid medium;
(b) said mixture is brought into contact with a basic compound, whereby a precipitate is obtained;
(c) said precipitate is heated in a liquid medium;
(d) an additive, chosen from anionic surfactants, nonionic surfactants, polyethylene glycols, carboxylic acids and their salts, and surfactants of the carboxymethylated ethoxylates of fatty alcohols type, is added to the precipitate obtained in the preceding stage;
(e) the precipitate is washed on conclusion of stage (d);
(f) the precipitate thus obtained is calcined.

The first stage (a) of the process according to the first alternative form thus consists in preparing a mixture in a liquid medium of the compounds of the constituent elements of the composition, that is to say zirconium, cerium, lanthanum and the other rare earth metal.

The mixture is generally prepared in a liquid medium, which is preferably water.

The compounds are preferably soluble compounds. They can in particular be salts of zirconium, cerium, lanthanum and the other rare earth metal. These compounds can be chosen from nitrates, sulfates, acetates, chlorides, ceric ammonium nitrates.

Mention may thus be made, as examples, of zirconium sulfate, zirconyl nitrate or zirconyl chloride. Use is most generally made of zirconyl nitrate. Mention may also be made in particular of cerium(IV) salts, such as nitrates or ceric ammonium nitrates, for example, which are particularly well suited here. Ceric nitrate is preferably used. It is advantageous to use salts with a purity of 99.5% and more particularly of at least 99.9%. An aqueous ceric nitrate solution can, for example, be obtained by reaction of nitric acid with a ceric oxide hydrate prepared conventionally by reaction of a solution of a cerous salt, for example cerous nitrate, and of an aqueous ammonia solution in the presence of aqueous hydrogen peroxide solution. Use may also preferably be made of a ceric nitrate solution obtained according to the process for the electrolytic oxidation of a cerous nitrate solution, such as described in the document FR-A-2 570 087, which in this instance constitutes an advantageous starting material.

It should be noted here that the aqueous solutions of cerium salts and of zirconyl salts can exhibit a degree of initial free acidity which can be adjusted by addition of a base or of an acid. However, it is just as possible to employ an initial solution of cerium and zirconium salts effectively exhibiting a degree of free acidity as mentioned above as solutions which will have been neutralized beforehand more or less exhaustively. This neutralization can be carried out by addition of a basic compound to the abovementioned mixture so as to limit this acidity. This basic compound can, for example, be an aqueous ammonia solution or alternatively a solution of alkali metal (sodium, potassium, and the like) hydroxides but preferably an aqueous ammonia solution.

Finally, it should be noted that, when the starting mixture comprises cerium essentially in the III form, it is preferable to involve an oxidizing agent, for example aqueous hydrogen peroxide solution, in the course of the process. This oxidizing agent can be used by being added to the reaction medium during stage (a) or during stage (b) or also at the end of the latter.

It is also possible to use a sol as starting zirconium or cerium compound. The term "sol" denotes any system composed of fine solid particles of colloidal dimensions, that is to say dimensions of between approximately 1 nm and approximately 500 nm, based on a zirconium or cerium compound, this compound generally being a zirconium or cerium oxide and/or oxide hydrate, in suspension in an aqueous liquid phase, it being possible in addition for said particles optionally to comprise residual amounts of bonded or adsorbed ions, such as, for example, nitrates, acetates, chlorides or ammoniums. It should be noted that, in such a sol, the zirconium or the cerium may be found either entirely in the form of colloids or simultaneously in the form of ions and in the form of colloids.

The mixture can be obtained without distinction either from compounds initially in the solid state which will be subsequently introduced into an aqueous vessel heel, for example, or alternatively directly from solutions of these compounds and then mixing said solutions in any order.

In the second stage (b) of the process according to the first alternative form, said mixture is brought into contact with a basic compound. Products of the hydroxide type can be used as base or basic compound. Mention may be made of alkali metal or alkaline earth metal hydroxides. Use may also be made of secondary, tertiary or quaternary amines. However, amines and aqueous ammonia may be preferred insofar as they reduce the risk of pollution by alkali metal or alkaline earth metal cations. Mention may also be made of urea. The basic compound can more particularly be used in the form of a solution.

The way in which the mixture and the basic compound are brought into contact, that is to say the order of introduction of these, is not critical. However, this contacting operation can be carried out by introducing the mixture into the basic compound in the form of a solution. It is preferable to proceed in this way in order to obtain the compositions of the invention in the form of a pure solid solution.

The contacting operation or the reaction between the mixture and the basic compound, in particular the addition of the mixture to the basic compound in the form of a solution, can be carried out all at once, gradually or continuously, and it is preferably carried out with stirring. It is preferably carried out at ambient temperature.

The following stage (c) of the process according to the first alternative form is the stage of heating the precipitate in an aqueous medium.

This heating can be carried out directly on the reaction medium obtained after reaction with the basic compound or on a suspension obtained after separation of the precipitate from the reaction medium, optional washing and resuspending in water of the precipitate. The temperature at which the medium is heated is usually at least 100° C. and it is generally between 100° C. and 160° C. The heating operation can be carried out by introducing the liquid medium into an enclosed space (closed reactor of the autoclave type). Under the temperature conditions given above, and in an aqueous medium, it may thus be specified, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures in the region of 100° C.

The heating can be carried out either under air or under an inert gas atmosphere, preferably nitrogen.

The duration of the heating can vary within wide limits, for example between 30 minutes and 48 hours, preferably between 1 and 5 hours. The rise in temperature likewise takes place at a rate which is not critical and it is thus possible to achieve the set reaction temperature by heating the medium, for example, for between 30 minutes and 4 hours, these values being given entirely by way of indication.

It is possible to carry out several heating operations. Thus, the precipitate obtained after the heating stage and optionally one or more washing operations can be resuspended in water and then another heating operation can be carried out on the medium thus obtained. This other heating operation is carried out under the same conditions as those which have been described for the first.

The following stage (d) of the process consists in adding, to the precipitate resulting from the preceding stage, an additive which is chosen from anionic surfactants, nonionic surfactants, polyethylene glycols and carboxylic acids and their salts, and also surfactants of the carboxymethylated ethoxylates of fatty alcohols type.

As regards this additive, reference may be made to the teaching of application WO 98/45212 and use may be made of the surfactants described in this document.

Mention may be made, as surfactants of the anionic type, of ethoxycarboxylates, ethoxylated fatty acids, sarcosinates, phosphate esters, sulfates, such as alcohol sulfates, alcohol ether sulfates and sulfated alkanolamide ethoxylates, sulfonates, such as sulfosuccinates, alkylbenzenesulfonates or alkylnaphthalenesulfonates.

Mention may be made, as nonionic surfactants, of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may in particular be made of the products sold under the brand names Igepal®, Dowanol®, Rhodamox® and Alkamide®.

As regards the carboxylic acids, use may in particular be made of aliphatic mono- or dicarboxylic acids and, among these, more particularly of saturated acids. Use may also be made of fatty acids and more particularly of saturated fatty acids. Mention may thus in particular be made of formic, acetic, propionic, butyric, isobutyric, valeric, caproic, caprylic, capric, lauric, myristic and palmitic acids. Mention may be made, as dicarboxylic acids, of oxalic, malonic, succinic, glutaric, adipic, pimelic, suberic, azelaic and sebacic acids.

The salts of the carboxylic acids can also be used, in particular the ammoniacal salts.

Mention may more particularly be made, by way of example, of lauric acid and ammonium laurate.

Finally, it is possible to use a surfactant which is chosen from those of the carboxymethylated ethoxylates of fatty alcohols type.

The term "product of the carboxymethylated ethoxylates of fatty alcohols type" is understood to mean products composed of ethoxylated or propoxylated fatty alcohols comprising a $CH_2$—COOH group at the chain end.

These products can correspond to the formula:

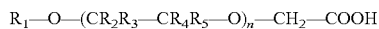

$$R_1-O-(CR_2R_3-CR_4R_5-O)_n-CH_2-COOH$$

in which $R_1$, denotes a saturated or unsaturated carbon chain, the length of which is generally at most 22 carbon atoms, preferably at least 12 carbon atoms; $R_2$, $R_3$, $R_4$ and $R_5$ can be identical and represent hydrogen or alternatively $R_2$ can represent a $CH_3$ group and $R_3$, $R_4$ and $R_5$ represent hydrogen; n is a nonzero integer which can range up to 50 and more particularly of between 5 and 15, these values being inclusive. It should be noted that a surfactant can be composed of a mixture of products of the above formula for which $R_1$, can be saturated or unsaturated respectively or alternatively products comprising both —$CH_2$—$CH_2$—O— and —$CH(CH_3)$—$CH_2$—O— groups.

The surfactant can be added in two ways. It can be added directly to the precipitate suspension resulting from the preceding heating stage (c). It can also be added to the solid precipitate after separation of the latter by any known means from the medium in which the heating took place.

The amount of surfactant used, expressed as percentage by weight of additive with respect to the weight of the composition, calculated as oxide, is generally between 5% and 100%, more particularly between 15% and 60%.

According to a specific embodiment of the process, it is possible to subject the suspended precipitate to moderate-energy milling by subjecting this suspension to shearing, for example using a colloid mill or a stirring turbine.

On conclusion of stage (d), the precipitate is washed after having separated it from the medium in which it occurred in suspension. This washing operation can be carried out with water, preferably with water at basic pH, for example aqueous ammonia solution.

In a final stage of the process according to the first alternative form, the precipitate recovered is subsequently calcined. This calcination makes it possible to develop the crystallinity of the product formed and it can also be adjusted and/or chosen according to the subsequent operating temperature intended for the composition according to the invention, this being done while taking into account the fact that the specific surface of the product decreases as the calcination temperature employed increases. Such a calcination is generally carried out under air.

In practice, the calcination temperature is generally restricted to a range of values of between 500 and 1000° C.

The process according to the second alternative form will now be described. This process makes it possible to obtain the compositions according to the third and fourth embodiments, that is to say the compositions which exhibit improved reducibility properties.

This process according to the second alternative form comprises all the stages (a) to (e) which were described above in the context of the process according to the fist alternative form. Consequently, everything which is described above for these stages likewise applies here for the description of this process.

The process according to the second alternative form comprises a stage (f') in which a double calcination of the precipitate obtained above on conclusion of stage (e) is carried out, namely a first calcination of the precipitate under an inert gas or under vacuum and then a second calcination under an oxidizing atmosphere.

The first calcination is carried out under an inert gas or under vacuum. The inert gas can be helium, argon or nitrogen. The vacuum is generally a low vacuum with a partial oxygen pressure of less than $10^{-1}$ mbar. The calcination temperature is generally at least 900° C. There is a risk, at a temperature below this value, of not resulting in a product exhibiting the reducibility characteristics given above. The increase in the calcination temperature results in an increase in the reducibility, which can reach values of 100% towards the highest temperatures. In addition, the temperature is set at a value taking into account the fact that the specific surface of the product decreases as the calcination temperature employed increases. Thus, generally, the maximum calcination temperature is at most 1000° C. as there is a risk of the specific surface being insufficient above this value. The duration of this first calcination is generally at least 2 hours, preferably at least 4 hours and in particular at least 6 hours. An increase in this duration usually results in an increase in the degree of reducibility. Of course, the duration can be set as a function of the temperature, a short duration of calcination requiring a higher temperature.

A second calcination under an oxidizing atmosphere is carried out on conclusion of the first calcination. The term "oxidizing atmosphere" is understood to mean the air or a gas with an oxidizing property, such as ozone, more particularly an air/oxidizing gas mixture. This second calcination is generally carried out at a temperature of at least 600° C. over a duration which is generally at least 30 minutes. A temperature of less than 600° C. can make it difficult to remove the additives used during stage (d) described above. It is preferable not to exceed a calcination temperature of 900° C.

The compositions of the invention as described above or as obtained in the process studied above are provided in the form of powders but they can optionally be shaped in order to be provided in the form of granules, balls, cylinders or honeycombs of variable sizes.

The compositions of the invention can be used as catalysts or catalyst supports. Thus, the invention also relates to catalytic systems comprising the compositions of the invention. For such systems, these compositions can thus be applied to any support commonly used in the field of catalysis, that is to say in particular thermally inert supports. This support can be chosen from alumina, titanium oxide, cerium oxide, zirconium oxide, silica, spinels, zeolites, silicates, crystalline silicoaluminum phosphates or crystalline aluminum phosphates.

The compositions can also be used in catalytic systems comprising a coating (wash coat), based on these compositions and with catalytic properties, on a substrate of the metal or ceramic monolith type, for example. The coating can itself also comprise a support of the type of those mentioned above. This coating is obtained by mixing the composition with the support, so as to form a suspension which can subsequently be deposited on the substrate.

These catalytic systems and more particularly the compositions of the invention can have a great many applications. They are therefore particularly well suited to, and thus usable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion or catalytic oxidation of the soot emitted by internal combustion engines, such as diesel engines or petrol engines operating under lean burn conditions. Finally, the catalytic systems and the compositions of the invention can be used as $NO_x$ traps or to promote the reduction of the $NO_x$ compounds, even in an oxidizing medium.

In the case of these uses in catalysis, the compositions of the invention are employed in combination with precious metals; they thus act as support for these metals. The nature of these metals and the techniques for the incorporation of the latter in the support compositions are well known to a person skilled in the art. For example, the metals can be platinum, rhodium, palladium or iridium and they can, in particular, be incorporated in the compositions by impregnation.

Among the uses mentioned, the treatment of exhaust gases from internal combustion engines (automobile afterburning catalysis) is a particularly advantageous application. For this reason, the invention also relates to a process for the treatment of exhaust gases from internal combustion engines which is characterized in that use is made, as catalyst, of a catalytic system as described above or of a composition according to the invention and as described above.

Examples will now be given.

EXAMPLE 1

This example relates to a composition comprising 40% of zirconium, 40% of cerium, 6% of lanthanum and 14% of yttrium, these proportions being expressed as percentages by weight of the oxides $ZrO_2$, $CeO_2$, $La_2O_3$ and $Y_2O_3$.

152 ml of zirconium nitrate (264 g/l as $ZrO_2$), 163.9 ml of cerium nitrate (244 g/l as $CeO_2$, 6.8% of the total cerium in the $Ce^{3+}$ form, the remainder of the cerium in the $Ce^{4+}$ form and 0.6 mol/l of free acidity), 13.2 ml of lanthanum nitrate (454 g/l as $La_2O_3$) and 36.6 ml of yttrium nitrate (382 g/l as $Y_2O_3$) are introduced into a stirred beaker. The mixture is subsequently made up with distilled water so as to obtain 1 liter of a solution of nitrates.

253.4 ml of an aqueous ammonia solution (12 mol/l) are introduced into a stirred reactor and the solution is subsequently made up with distilled water so as to obtain a total volume of 1 liter.

The solution of nitrates is introduced into the reactor with continual stirring.

The solution obtained is placed in a stainless steel autoclave equipped with a stirrer. The temperature of the medium is brought to 150° C. for 2 hours with stirring.

33 grams of lauric acid are added to the suspension thus obtained. The suspension is kept stirred for 1 hour.

The suspension is then filtered through a Büchner funnel and then the filtered precipitate is washed with aqueous ammonia solution. The product obtained is subsequently brought to 700° C. for 4 hours under stationary conditions.

EXAMPLES 2 TO 8

The procedure is the same as in example 1. The compositions and amounts of reactants employed are shown in tables 1 and 2 respectively below. For example 6, the gadolinium nitrate solution exhibits a concentration of 380 g/l of $Gd_2O_3$. For example 7, the samarium nitrate solution exhibits a concentration of 369 g/l of $Sm_2O_3$.

Table 1 of the compositions
The proportions are expressed as percentages by weight of the oxides

| Example | % Zr | % Ce | % La | % Y | % Gd | % Sm |
|---------|------|------|------|------|------|------|
| 2 | 45 | 40 | 2.8 | 12.2 | — | — |
| 3 | 37.9 | 40 | 10.7 | 11.4 | — | — |
| 4 | 40 | 40 | 11.8 | 8.2 | — | — |
| 5 | 45 | 40 | 7.3 | 7.7 | — | — |
| 6 | 37.9 | 40 | 10.7 | — | 11.4 | — |
| 7 | 37.9 | 40 | 10.7 | — | — | 11.4 |
| 8 | 48 | 30 | 11 | 11 | — | — |

Table 2 of the amounts of reactants
The amounts are expressed as volume (ml) of the aqueous ammonia solutions or the nitrate solutions of the elements concerned

| Example | Zr | Ce | La | Y | Gd/Sm | Aqueous ammonia |
|---|---|---|---|---|---|---|
| 2 | 170 | 163.9 | 6.2 | 31.9 | — | 250.8 |
| 3 | 144 | 163.9 | 23.6 | 29.8 | — | 251.2 |
| 4 | 152 | 163.9 | 26 | 21.5 | — | 247.8 |
| 5 | 170 | 163.9 | 16.1 | 20.2 | — | 246.5 |
| 6 | 144 | 163.9 | 23.6 | — | 30 | 251.2 |
| 7 | 144 | 163.4 | 23.6 | — | 30.9 | 251.2 |
| 8 | 182 | 122.9 | 24.2 | 28.8 | — | 241 |

In order to determine their thermal stability, the compositions were subjected to calcinations under air at different temperatures. The specific surfaces measured after these heat treatments are given in the following table 3. The values are expressed as $m^2/g$.

TABLE 3

| Example | 4 h/1000° C. | 10 h/1150° C. | 10 h/1200° C. |
|---|---|---|---|
| 1 | 54 | 20 | 10 |
| 2 | 54 | 15 | 8 |
| 3 | 56 | 20 | 12 |
| 4 | 56 | 20 | 7 |
| 5 | 55 | 16 | 5 |
| 6 | 49 | 15 | 7 |
| 7 | 47 | 16 | 7 |
| 8 | 53 | 15 | 6 |

After a heat treatment for 10 hours at 1150° C. under air, the X-ray analysis of these compositions systematically reveals a single phase of cubic symmetry. The analyses are carried out on a powder using a Panalytical diffractometer equipped with a multichannel detector of X'Celerator type and with a Kβ/Kα monochromator. The data are collected in 20 minutes between 2θ=10 and 2θ=95° with a step of 0.017 mm.

Figure 2:
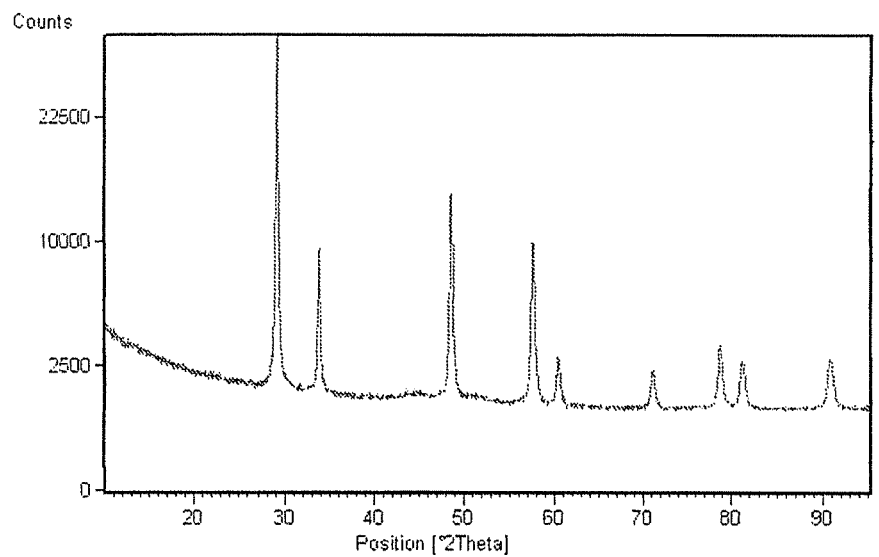
FIG. 2 is a diffractogram obtained by X-ray diffraction on another composition of the invention.

FIGS. 1 and 2 are diffractograms obtained by X-ray diffraction on the compositions of examples 1 and 6 respectively.

COMPARATIVE EXAMPLE 9

This example relates to a composition comprising 50% of zirconium, 40% of cerium, 5% of lanthanum and 5% of yttrium, these proportions being expressed as percentages by weight of the oxides $ZrO_2$, $CeO_2$, $La_2O_3$ and $Y_2O_3$. The proportion of lanthanum and of yttrium is lower than that of these same elements in the compositions according to the invention. The amounts of reactants employed in the preparation of this composition and the specific surfaces of the latter at different temperatures are respectively shown in the following tables 4 and 5.

TABLE 4

The amounts are expressed as volume (ml) of the aqueous ammonia solutions or the nitrate solutions of the elements concerned

| Example | Zr | Ce | La | Y | Aqueous ammonia |
|---|---|---|---|---|---|
| 9 | 189 | 163.9 | 11.1 | 13.1 | 243 |

TABLE 5

| | Values in $m^2/g$ | | |
|---|---|---|---|
| Example | 4 h/1000° C. | 10 h/1150° C. | 10 h/1200° C. |
| 9 | 45.6 | 9 | 3 |

The following examples show the advantage of the process according to the second alternative form in the preparation of compositions with improved reducibility.

The degree of reducibility was measured under the following conditions.

Degree of Reducibility

The degree of reducibility of the cerium is measured by carrying out a temperature-programmed reduction on an Ohkura Riken TP5000 device. This device makes it possible to measure the hydrogen consumption of a composition according to the invention as a function of the temperature and to deduce therefrom the degree of reduction of the cerium.

More specifically, hydrogen is used as reducing gas at 10% by volume in argon with a flow rate of 30 ml/min. The experimental protocol consists in weighing 200 mg of the sample into a pretared container. The sample is subsequently introduced into a quartz cell comprising, in the bottom, quartz wool. Finally, the sample is covered with quartz wool and placed in the oven of the measuring device. The temperature program is as follows:

oxidation: rise in temperature up to 500° C. with a rise slope at 10° C./min under $O_2$ at 5 vol % in He;
stationary phase of 30 min and then downward slope to 30° C.;
treatment at 30° C. under Ar for 20 min;
reduction: rise in temperature up to 900° C. with a rise slope at 20° C./min under $H_2$ at 10 vol % in Ar;
calibration;
downward temperature slope under Ar from 900° C. to 30° C.

During this program, the temperature of the sample is measured using a thermocouple placed in the quartz cell above the sample. The hydrogen consumption during the reduction phase is deduced by virtue of the calibration of the variation in the thermal conductivity of the gas stream measured at the outlet of the cell using a thermal conductivity detector (TCD).

The degree of reduction of the cerium is calculated from the hydrogen consumption measured between 30° C. and 900° C.

EXAMPLE 10

This example relates to a composition comprising 40% of zirconium, 38% of cerium, 11% of lanthanum and 11% of yttrium, these proportions being expressed as percentages by weight of the oxides $ZrO_2$, $CeO_2$, $La_2O_3$ and $Y_2O_3$.

145 ml of zirconium nitrate (265 g/l as $ZrO_2$), 145 ml of cerium nitrate (254 g/l as $CeO_2$), 24 ml of lanthanum nitrate (456 g/l as $La_2O_3$) and 27 ml of yttrium nitrate (382 g/l as $Y_2O_3$) are introduced into a stirred beaker. The mixture is subsequently made up with distilled water so as to obtain 1 liter of a solution of nitrates.

225 ml of an aqueous ammonia solution (12 mol/l) are introduced into a stirred reactor and the solution is subsequently made up with distilled water so as to obtain a total volume of 1 liter.

The solution of nitrates is introduced into the reactor over one hour with continual stirring.

The suspension thus obtained is placed in a stainless steel autoclave equipped with a stirrer. The temperature of the medium is brought to 150° C. for 2 hours with stirring.

33 grams of lauric acid are added to the suspension thus obtained. The suspension is kept stirred for 1 hour.

The suspension is then filtered through Büchner funnel and then aqueous ammonia solution is added to the filtered precipitate in a portion of one times the volume of the filtration mother liquors.

The precipitate obtained after filtration and washing is subsequently calcined under air for 4 hours at 900° C.

EXAMPLE 11

This example illustrates the fourth embodiment of the invention.

The same composition is prepared as in example 10, the procedure being the same up to the calcination stage.

A first calcination is subsequently carried out under an inert gas at 1000° C. for 4 h. After returning to ambient temperature, a second calcination is carried out under air at 700° C. for 4 h.

The characteristics of reducibility and of specific surface of the products of examples 10 and 11 are given in the following tables.

The surface and reducibility values given were measured on products obtained according to the process described in the examples and which were again subjected to calcination at the temperatures and for the durations shown in the tables.

TABLE 6

| Reducibility | Calcination | | |
|---|---|---|---|
| | 4 h 900° C. | 4 h 1000° C. | 4 h 1100° C. |
| Example 11 | 85% | 69% | 63% |
| Example 10 | 64% | 62% | 60% |

TABLE 7

| Surface | Calcination | | | |
|---|---|---|---|---|
| | 4 h 900° C. | 4 h 1000° C. | 4 h 1150° C. | 4 h 1200° C. |
| Example 11 | 51 m$^2$/g | 47.5 m$^2$/g | 20 m$^2$/g | 12 m$^2$/g |
| Example 10 | 65 m$^2$/g | 52 m$^2$/g | 20 m$^2$/g | 12 m$^2$/g |

It is specified that, after calcination for 10 h at 1150° C., the products from examples 10 and 11 exist in the form of a single cubic crystal phase.

It is seen that the composition according to example 11 exhibits a markedly improved reducibility at 900° C., 1000° C. and 1100° C. while retaining a high specific surface, even at high temperatures.

What is claimed is:

1. A composition consisting essentially of zirconium oxide, a cerium oxide, a lanthanum oxide, and an oxide of another rare earth metal selected from the group consisting of yttrium, gadolinium, and samarium, and having the following characteristics:
   a specific surface area after calcination for 4 hours at 1000° C. of at least 45 m$^2$/g;
   a specific surface area after calcination for 10 hours at 1150° C. of at least 15 m$^2$/g;
   a specific surface area after calcination for 10 hours at 1200° C. of at least 7 m$^2$/g;
   a content of cerium oxide of between 30% and 45% by weight; and,
   a content of lanthanum oxide and of oxide of the other rare earth metal comprised between 15% and 35% by weight, the content of lanthanum oxide being at least of 2% by weight.

2. A composition consisting essentially of a zirconium oxide, a cerium oxide, a lanthanum oxide, and an oxide of another rare earth metal selected from the group consisting of yttrium, gadolinium, and samarium, and having the following characteristics:
   a specific surface area after calcination for 4 hours at 1000° C. of at least 45 m$^2$/g;
   a specific surface area after calcination for 10 hours at 1150° C. of at least 15 m$^2$/g; the composition on conclusion of this calcination being in the form of a pure solid solution;
   a specific surface area after calcination for 10 hours at 1200° C. of at least 5 m$^2$/g;
   a content of cerium oxide of between 30% and 45% by weight; and,
   a content of lanthanum oxide and of oxide of the other rare earth metal of between 15% and 35% by weight, the content of lanthanum oxide being at least of 2% by weight.

3. The composition as claimed in claim 2, having a specific surface area after calcination for 10 hours at 1200° C. of at least 7 m$^2$/g.

4. The composition as claimed in claim 2, having a specific surface area after calcination for 4 hours at 1000° C. of at least 50 m$^2$/g.

5. The composition as claimed in claim 2, having a specific surface area after calcination for 10 hours at 1150° C. of at least 18 m$^2$/g.

6. The composition as claimed in claim 2, having a specific surface area after calcination for 10 hours at 1200° C. of at least 10 m$^2$/g.

7. The composition as claimed in claim 2, having a content of lanthanum oxide and of oxide of the other rare earth metal of between 30% and 35% by weight and a content of cerium oxide of 30% by weight.

8. The composition as claimed in claim 2, having a content of lanthanum and of the other rare earth metal in a ratio of weight of lanthanum oxide/weight of oxide of the other rare earth metal of less than 1.5.

9. The composition as claimed in claim 2, having a content of lanthanum and of the other rare earth metal in a ratio of weight of lanthanum oxide/weight of oxide of the other rare earth metal of less than 1.

10. The composition as claimed in claim 2, having a content of cerium of between 40% and 45% by weight.

11. The composition as claimed in claim 2, having a degree of reducibility, measured on the composition calcined for 4 hours at 900° C., of at least 80%.

12. The composition as claimed in claim 2, having a degree of reducibility, measured on the composition calcined for 4 hours at 900° C., of at least 85%.

13. The composition as claimed in claim 2, having a degree of reducibility, measured on the composition calcined for 4 hours at 900° C., of at least 90%.

* * * * *

UNITED STATES PATENT AND TRADEMARK OFFICE
CERTIFICATE OF CORRECTION

| | | |
|---|---|---|
| PATENT NO. | : 8,728,435 B2 | Page 1 of 1 |
| APPLICATION NO. | : 12/300845 | |
| DATED | : May 20, 2014 | |
| INVENTOR(S) | : Olivier Larcher et al. | |

It is certified that error appears in the above-identified patent and that said Letters Patent is hereby corrected as shown below:

On the title page insert item (30),

--Foreign Application Priority Data

Nov. 16, 2006     (FR) ...........................06 10033
May 15, 2006      (FR) ..........................06 04287--

Signed and Sealed this
Seventh Day of October, 2014

Michelle K. Lee
*Deputy Director of the United States Patent and Trademark Office*